United States Patent [19]
Curless

[11] 3,958,492
[45] May 25, 1976

[54] ELECTRICALLY COMPENSATED ELECTROHYDRAULIC SERVO SYSTEM WITH POSITION RELATED FEEDBACK LOOP

[75] Inventor: Richard Anderson Curless, Cincinnati, Ohio

[73] Assignee: Cincinnati Milacron, Inc., Cincinnati, Ohio

[22] Filed: Mar. 12, 1975

[21] Appl. No.: 557,596

[52] U.S. Cl. ............................... 91/363 R; 91/462
[51] Int. Cl.² ........................ F15B 9/03; F15B 9/09
[58] Field of Search ............ 91/363 R, 363 A, 362, 91/361

[56] References Cited
UNITED STATES PATENTS

| | | | |
|---|---|---|---|
| 2,470,099 | 5/1949 | Hall | 91/363 R |
| 2,803,221 | 8/1957 | Walker et al. | 91/363 R |
| 3,464,318 | 9/1969 | Thayer et al. | 91/363 R |
| 3,665,809 | 5/1972 | Walker | 91/363 A |

Primary Examiner—Paul E. Maslousky
Attorney, Agent, or Firm—Daniel P. Worth

[57] ABSTRACT

An electrohydraulic servo system is compensated by an electrical control system and has a position related feedback loop and a servovalve with a differential pressure transducer connected as a feedback loop between the output and return lines that extend to a hydraulic motor or other driven means from said servovalve.

9 Claims, 4 Drawing Figures

DPF & BRIDGE-T IN TANDEM WITH LEAD-LAG NETWORK

PRIOR ART

DPF ONLY

ELECTRICALLY COMPENSATED ELECTROHYDRAULIC SERVO SYSTEM WITH POSITION RELATED FEEDBACK LOOP

SUMMARY AND BACKGROUND

The present invention relates to an electrically compensated electrohydraulic servo system with position related feedback loop in combination with a servovalve having a differential pressure transducer connected across the lines or conduits that communicate with the drive means. One aspect of the present invention is the combination of bridged-T and lead-lag electrical networks with a servovalve having a differential pressure transducer feedback connected across the lines to the motor and a feedback loop to provide a signal representative of motor movement. An aspect is the provision of a combination as in the preceding sentence to drive a motor such as a hydraulic cylinder to linearly position a slide element in a machine in connection with which the invention without intention of being limited thereto will be described.

Electrohydraulic servosystems are frequently troubled by vibrations. Systems with feedback loops especially may become unstable when the vibration frequency approaches or equals a resonant frequency of the system because of the additive effects sometimes resulting from the feedback. Where exact positioning, smooth operation, acoustical and control noise reduction, and holding (i.e. position holding) are important factors, as in machine tool positioning, reduction of vibration problems is important if the machine tool is to perform its function with the degree of precision required and if products thereof are to have correct dimensions and surface finish.

The present invention provides a low damped, low gain system with enhanced vibration dampening and ability to block out the primary resonant frequency whereby a system of ostensible high gain and high damping is achieved.

The present invention comprehends an electrically compensated electrohydraulic position control servo system having a negative feedback loop for controllably positioning a drive means said system comprising a bridged-T network; a source of a reference signal; a summing junction connected between said source and said bridged-T to provide an error signal as an input signal to said bridged-T; a dynamic pressure feedback servovalve assembly comprising a servovalve having as an output a pair of hydraulic lines for connection to said drive means as supply and return lines thereof, a differential pressure transducer connected as a feedback loop between said lines in pressure communication with the hydraulic flow area within each such line, and electric power means to position said servovalve; a lead-lag network connected between said bridged-T and said power means; a position transducer connected in said position feedback loop between the output from said drive means and said summing junction; and means for delivering a control signal from the output of said lead-lag network to said servovalve assembly; whereby position reference signals from said source position said drive means in a lowly damped low gain system of enhanced stiffness and minimized overshoot.

Certain components and subcombinations used in this invention are admitted to be per se old: Bridged-T and lead-lag networks both alone and in combination are per se old (See Merritt infra pp. 246-258 and See AIEE — now named IEEE — Paper No. 59-220, July 1959, Chandaket and Rosenstein "Notes on Bridged-T . . . Network Loading" pp. 148, 162). Dynamic or differential pressure feedback servovalves per se are also admitted to be old (Merritt "Hydraulic Control Systems" — publ. 1967 John Wiley, Catalog Card No. 66 - 28759 — p. 140, 141; Blackburn et al. "Fluid Power Control" — publ. 1960 The M.I.T. Press Card No. 59-6759 — pp. 518).

Objectives, advantages, and features in addition to those indicated above should appear upon a reading of the following specification and drawings wherein.

Figure 1:
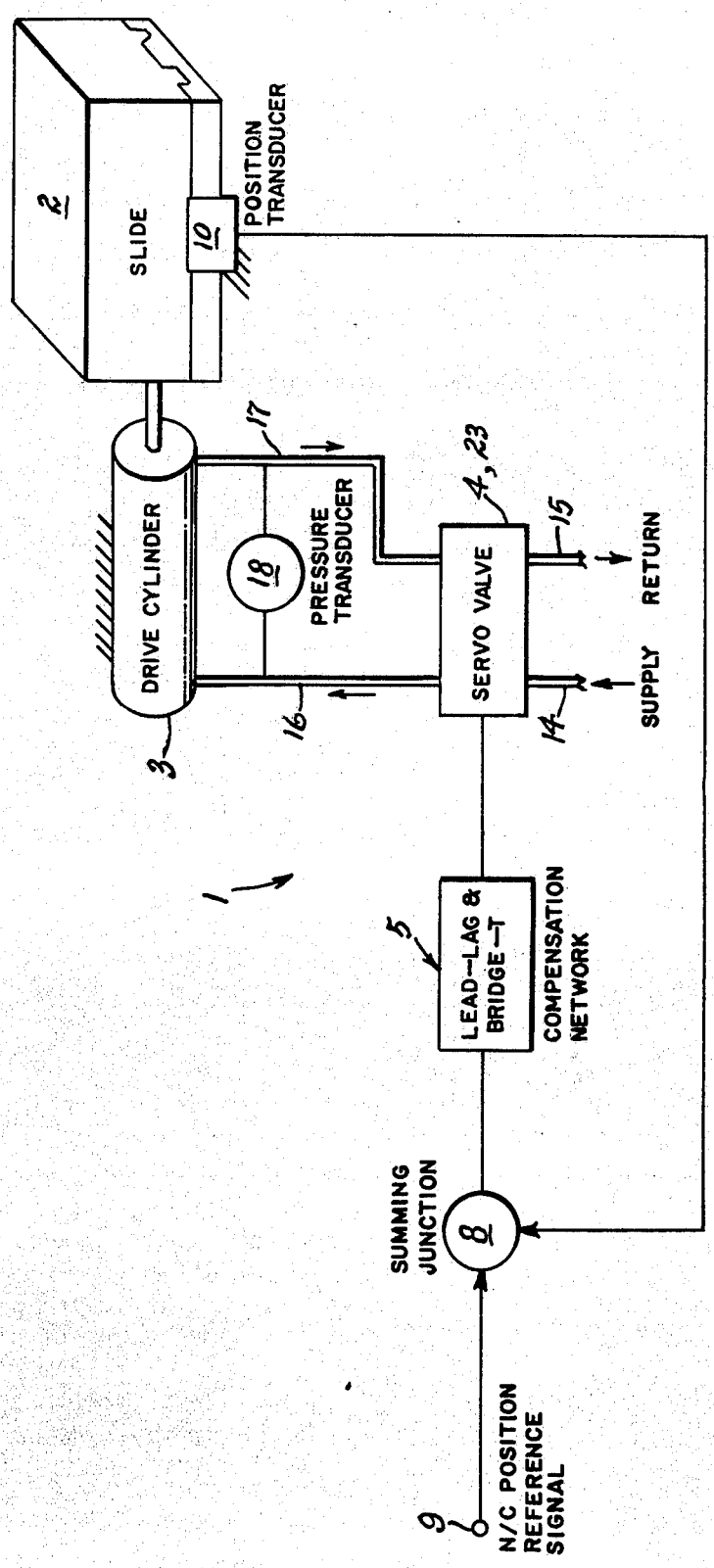
FIG. 1 is a schematic block diagram of an electrohydraulic servo system for controlling a slide to the present invention.

FIG. 1 illustrates an electrohydraulic control system 1 according to the invention for controlling the position of a machine element 2, which is illustrated as a slide mechanism. The positioning is done by a hydraulic drive means 3 which is positioned by a dynamic or differential pressure feedback servovalve 4 that regulates the flow of hydraulic liquid into the drive means or motor 3. The servovalve 4 is controlled by a compensating network 5 in such a manner that slide 2 is positioned with minimum error due to vibration.

The summing junction 8 provides an input signal to the network 5. Two inputs are applied to the summing junction 8: one from a reference source 9 and the other as a negative feedback signal from the position transducer 10. The signal from transducer 10 is representative of the actual position of the slide whereas the reference source 9 provides a signal representative of the desired position of the slide. Source 9 preferably supplies a direct current signal which is algebraically added to a signal from 10 which latter very likely will be fluctuating or varying because vibration or other oscillation in the system will be causing cyclic positioning discrepancies of the slide 2. The summed signals form an error signal which is applied as the input signal to the compensating network 5 to thereby position the servovalve 4, hence ultimately the slide 2, with minimum effect on the slide position from oscillations in the compensating network.

The slide 2 may comprise any type of mechanism with relatively moving parts but preferably is a fixed way which supports another element that moves relative thereto. Examples of slide mechanisms are a lathe tail stock and lathe bed, a milling machine table and its support, and a moving platen of an injection molding machine. It might also be noted that a slide ordinarily is a component of the common slider crank mechanism.

The drive means 3 comprises a hydraulic motor, preferably a limited displacement type of positive displacement motor and more preferably may comprise a hydraulic cylinder and piston. A variety of limited displacement hydraulic motors are described in Merritt supra pp. 54 et. seq.

The dynamic pressure feedback servovalve 4 is preferably a spool type valve provided with supply and return lines 14 and 15 that connect it to the source of hydraulic liquid for the system. Load lines 16 and 17 are connected between the servovalve and the motor 3. A differential pressure cell or pressure transducer 18 is connected across the lines 16 and 17 to thereby provide in the fluid system itself some manner of maintaining a desired differential pressure. Such an arrangement also has a built in lag because of the transit time of hydraulic liquid and signals traveling therethrough between the respective motor supply and return lines 16 and 17.

The pressure transducer 18 may advantageously be a spring loaded accumulator with a flow restriction on either or both sides. Such devices are illustrated and described in Merritt and Blackburn supra.

Figure 2:
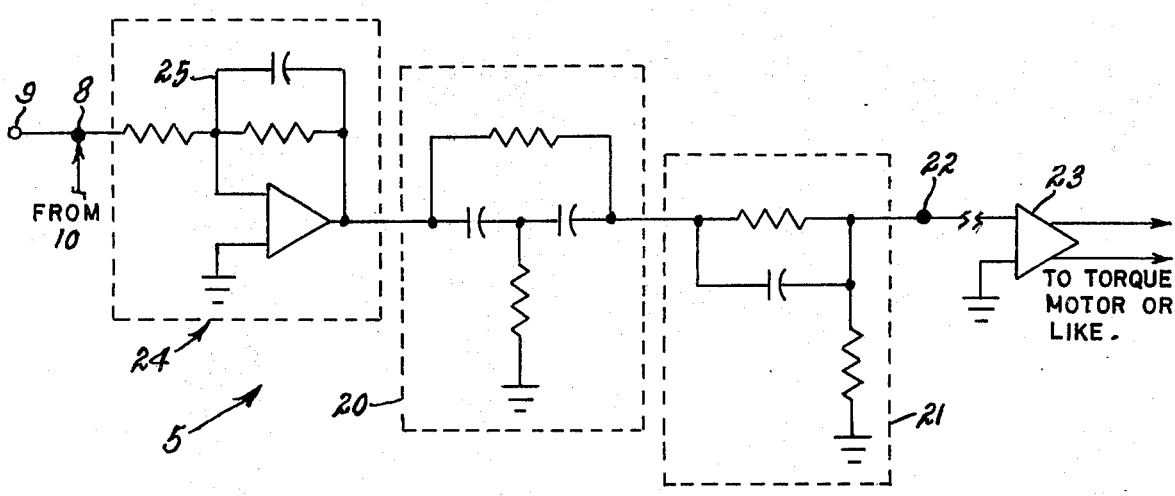
FIG. 2 is a schematic diagram of the electrical compensating network comprising a bridged-T and lead-lag networks according to the present invention and as applied to FIG. 1.

Referring now to FIG. 2 there is illustrated a preferred embodiment of the electrical portion of the compensating network 5. A bridged-T network 20 suitable for an impedance load is connected in series between the summing junction 8 and a lead-lag compensating network 21. The output from the system appears at terminal 22 whence it is applied to a suitable power amplifier and transducing means so that servovalve 4 is positioned responsive to said signal. Electrical power amplifying and transducing means are indicated generally as power amplifier 23, as being understood that the same may also comprehend the necessary torque motors and the like which are ordinarily part of the servovalve. Torque motors and other power means are described in Merrit and Blackburn supra.

The lead-lag network 21 operates as an impedance load on the bridge-T network 20. As noted in the July, 1959 AIEE paper cited above, there are a number of different kinds of bridge-T networks, depending on the load characteristics. The preferred bridge-T network of the present invention is illustrated schematically in FIG. 15 of the AIEE paper.

Preferably an operational amplifier 24 with a lag compensated negative feedback 25 and suitable gain control is connected in series between the summing junction 8 and the inputs to the bridge-T network 20.

The reference source 9 may comprise any suitable source of a direct current signal which is representative of the position desired for the slide 2 to assume. In other words it represents the ideal position. Advantageously, this signal source may comprise a numerical control system or a computer which is programmed to provide a predetermined series of signals representative of a predetermined series of positions to be assumed by the slide mechanism. Such operations are well-known in machine tools and need not be further elaborated upon here.

The position transducer 10 provides a continuous signal which is representative of the actual position assumed by the slide, or more broadly of the actual position assumed by the drive means or motor 3. Transducer 10 may be a linear potentiometer or preferably a linear resolver. Vibration causes the slide to oscillate and therefore the output signals from position transducer 10 has an oscillatory component which also appears in the output signal from summing junction 8 which is applied as the input signal to the compensation network 5. This oscillatory component is most likely to cause instability in the system. As viewed in a practical aspect, vibrations will cause positioning errors unless something is done about it. The present system is damped and otherwise made less sensitive to oscillations by reason of the combination illustrated in FIG. 1.

Figure 3:
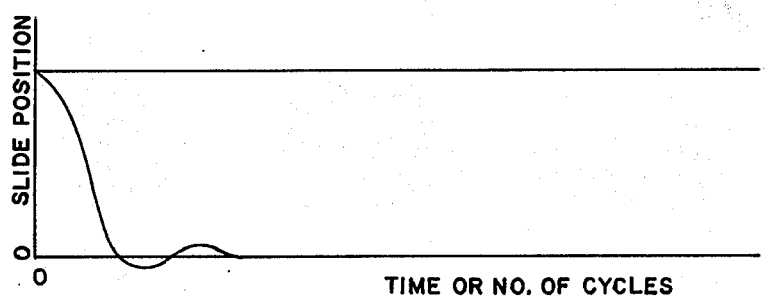
FIGS. 3 and 4 respectively illustrate the damping effect of the present (FIG. 1) system compared with a system having a differential pressure servovalve (DPF) without the networks of FIGS. 1, 2.
Figure 4:
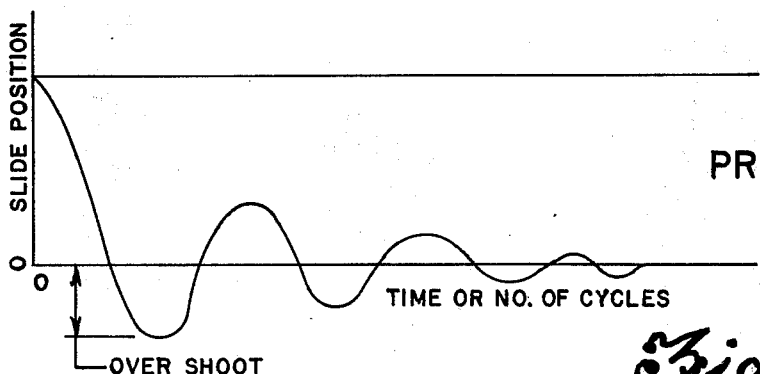

FIGS. 3 and 4 illustrate a comparative test of a system with and without the compensating network 5. FIG. 3 illustrates the operation of the present system whereas FIG. 4 illustrates a system without the network. Substantial overshoot and instability are exhibited in FIG. 4. It is evident from comparing the two that the present invention provides increased accuracy, minimum overshoot, reduces the time and number of oscillatory cycles to get into position and is sufficiently self-damping to minimize oscillatory errors. Moreover, changes in the position and slide 2 can be made while realizing these same advantages.

What is claimed is:

1. An electrically compensated electrohydraulic position control servosystem having a negative position feedback loop for controllably positioning a drive means said system comprising:
    a bridged-T network;
    a source of a reference signal;
    a summing junction connected between said source and said bridged-T to provide an error signal as an input signal to said bridged-T;
    a dynamic pressure feedback servovalve assembly comprising a servovalve having as an output a pair of hydraulic lines for connection to said drive means as supply and return lines thereof, a differential pressure transducer connected as a feedback loop between said lines in pressure communcation with the hydraulic flow area within each such line, and electric power means to position said servovalve;
    a lead-lag network connected between said bridged-T and said power means; and
    a position transducer connected in said position feedback loop between the output from said drive means and said summing junction; and
    means for delivering a control signal from the output of said lead-lag network to said servovalve assembly;
    whereby position reference signals from said source position said drive means in a lowly damped low gain system of enhanced stiffness and minimized overshoot.

2. An electrically compensated electrohydraulic system according to claim 1 further comprising an operational feedback amplifier connected in series between said bridged-T and said summing junction, the feedback loop thereof exhibiting lag compensation.

3. An according to claim 1 electrically compensated electrohydraulic system wherein said means for delivering comprises a power amplifier connected in series between said lead-lag network and said servovalve.

4. A system according to claim 3, that further comprises an operational feedback amplifier connected in series between said bridged-T and said summing junction, the feedback loop thereof exhibiting lag compensation.

5. An electrically compensated electrohydraulic system according to claim 1, further comprising means connected to said position transducer and within said negative feedback loop to provide to said summing junction a signal representative of the position of said drive means.

6. An electrically compensated electrohydraulic system according to claim 1, wherein said position transducer is a linear resolver.

7. An electrically compensated electrohydraulic system according to claim 1, further comprising a slide driven by said drive cylinder, said position transducer being connected to said slide.

8. An electrically compensated electrohydraulic system according to claim 1, wherein said source includes means to provide a series of reference signals each of predetermined magnitude and in a predetermined sequence.

9. An electrically compensated electrohydraulic system according to claim 1, further comprising a slide driven by said drive cylinder, said position transducer being connected to said slide and wherein said source includes means to provide a series of reference signals each of predetermined magnitude and in a predetermined sequence.

* * * * *